G. C. CONTANT.
DESICCATING MACHINE.
APPLICATION FILED JULY 18, 1919.
1,371,071.
Patented Mar. 8, 1921.
2 SHEETS—SHEET 1.
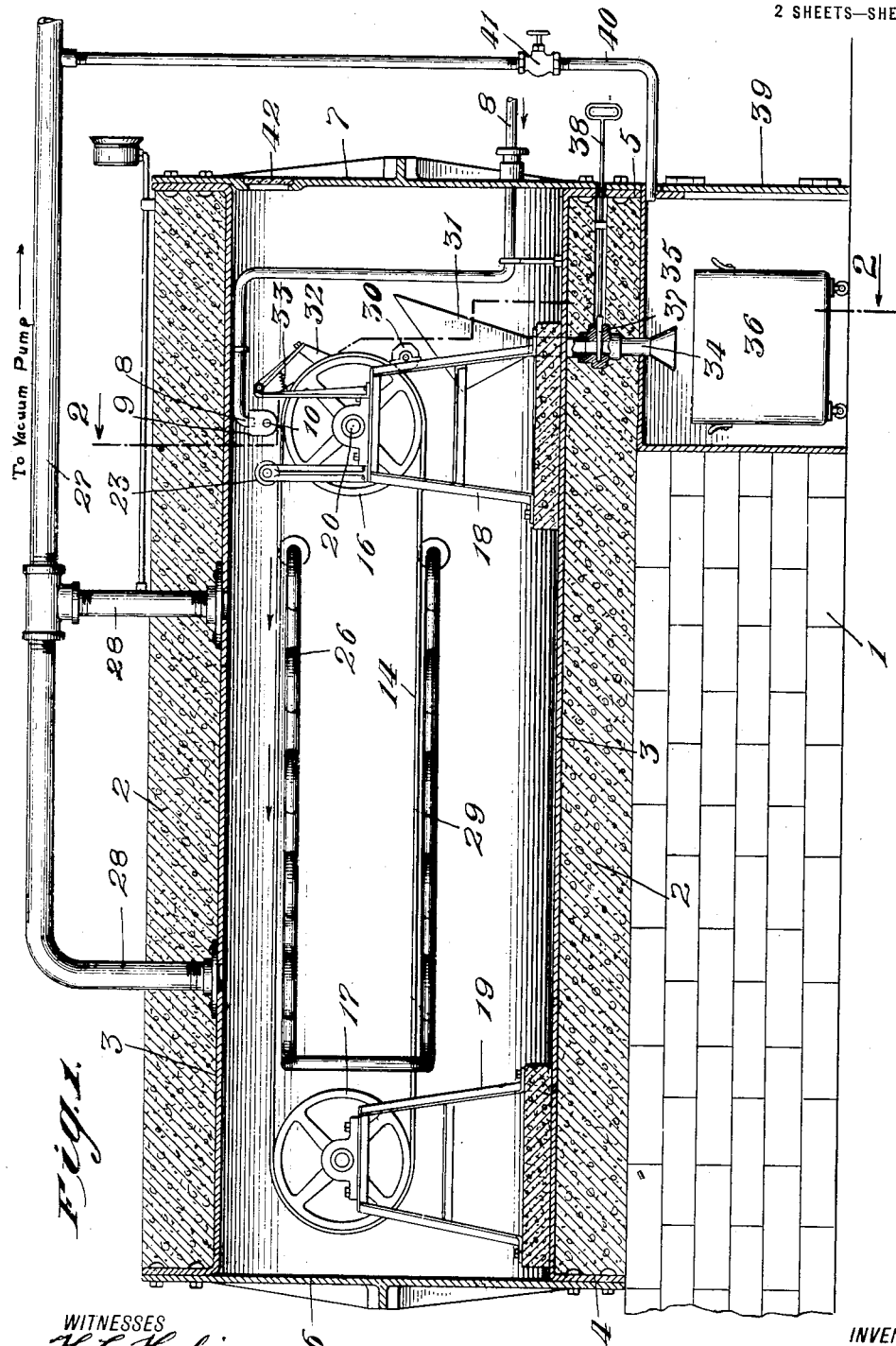
WITNESSES
H. C. Hebig
G. L. Kitchin
INVENTOR
GEO. C. CONTANT
BY
Mumm
ATTORNEYS G. C. CONTANT.
DESICCATING MACHINE.
APPLICATION FILED JULY 18, 1919.
1,371,071.
Patented Mar. 8, 1921.
2 SHEETS—SHEET 2.
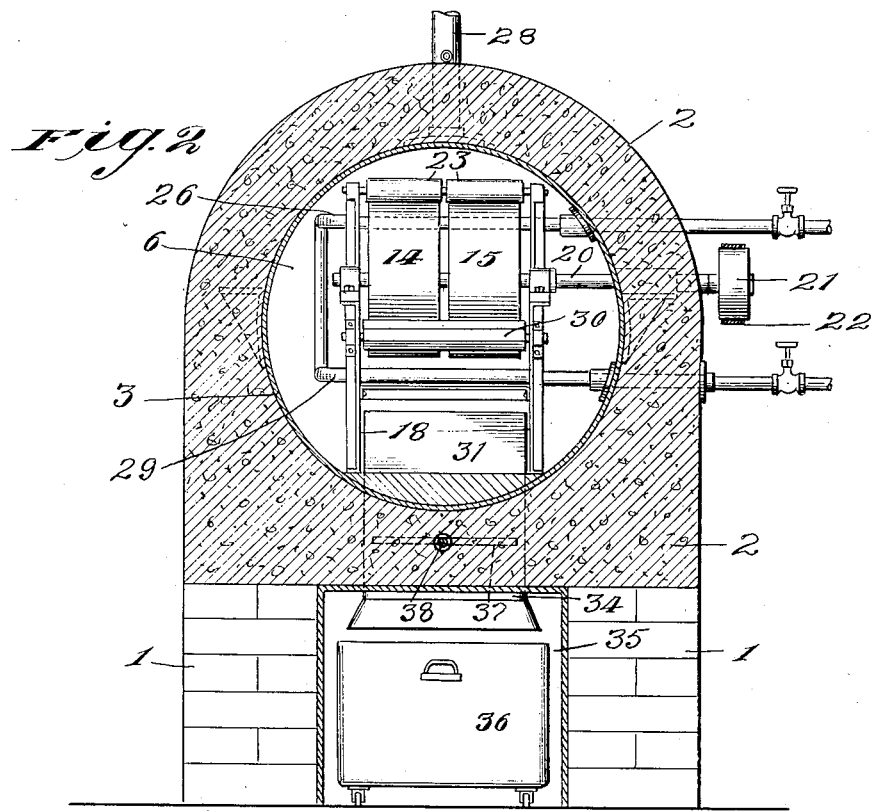
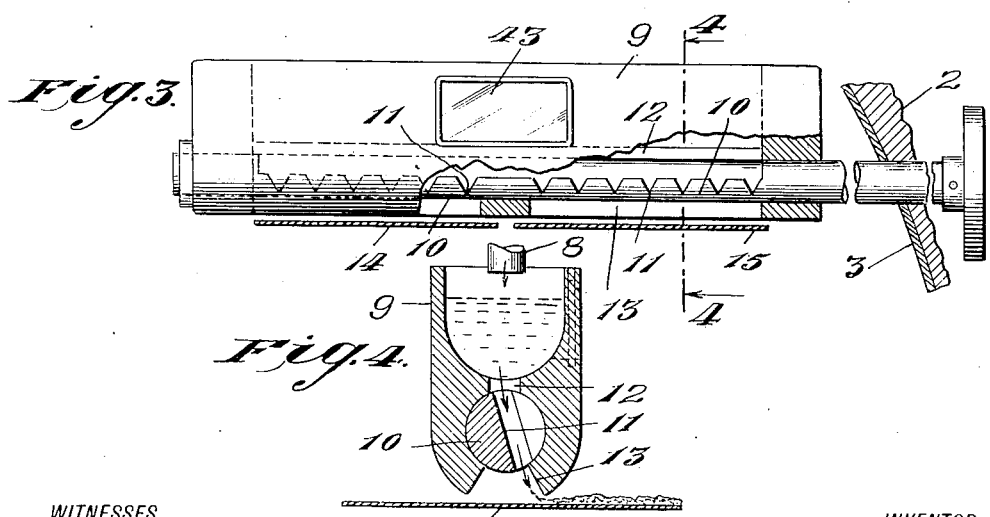
WITNESSES
H. C. Hebig
A. L. Kitchin
INVENTOR
GEO. C. CONTANT
BY
Munn & Co.
ATTORNEYS

UNITED STATES PATENT OFFICE.

GEORGE C. CONTANT, OF NEW YORK, N. Y., ASSIGNOR OF ONE-HALF TO JOSIAH DECKER, JR., OF MONTCLAIR, NEW JERSEY.

DESICCATING-MACHINE.

1,371,071.   Specification of Letters Patent.   Patented Mar. 8, 1921.

Application filed July 18, 1919. Serial No. 311,834.

*To all whom it may concern:*

Be it known that I, GEORGE C. CONTANT, a citizen of the United States, and a resident of the city of New York, borough of Manhattan, in the county and State of New York, have invented a new and useful Desiccating-Machine, of which the following is a full, clear, and exact description.

This invention relates to desiccating machines and has for an object to provide an improved, simple construction whereby liquid or semi-liquid may be desiccated quickly and in comparatively large bulk.

Another object of the invention is to provide an improved construction, wherein through the use of vacuum a minimum heat is necessary to produce the proper drying action.

A further object of the invention is to provide a machine in which a traveling belt is used with means for spreading the material to be desiccated thereover, the parts being so arranged that a large quantity may be desiccated in a minimum time.

In the accompanying drawings:

Figure 1 is a longitudinal vertical section through a desiccating machine disclosing an embodiment of the invention.

Fig. 2 is a transverse section through Fig. 1 on line 2—2.

Fig. 3 is an enlarged fragmentary sectional view through a distributing device embodying certain features of the invention.

Fig. 4 is an enlarged transverse fragmentary sectional view through Fig. 3 on line 4—4.

Referring to the accompanying drawing by numerals, 1 indicates a foundation which may be brick or other material, same supporting a concrete or cement body 2 which incloses a casing 3, shown circular in cross section, as indicated in Fig. 2. The particular shape, however, of this casing may be varied without departing from the spirit of the invention, as a casing square in cross section, or other shape in cross section may be used with equally good results. The casing 3 is preferably made from metal and provided with end flanges 4 and 5 overlapping the ends of the body 2 so as to be held in place thereby and also to receive the end plates 6 and 7 which are preferably made of metal and reinforced by suitable reinforcing ribs. This arrangement permits ready access to the material in casing 3 from either or both ends when desired. Arranged in the casing 3 is most of the mechanism, the same including one or more traveling belts, two belts being shown in the drawing, said belts being designed to receive the matter to be desiccated.

It will, of course, be understood that any desired material may be dried by the desiccating machine, but it is specially designed for desiccating a semi-liquid preparation, as for instance a mixture of milk and eggs. In the arrangement shown the milk and eggs, or any other matter desiccated will be thoroughly dried, but will not be cooked, whereby the original flavor remains, and in order to secure the original liquid or semi-liquid condition, all that is necessary to do is to add the proper proportion of water.

When desiccating a liquid, or semi-liquid, the same is forced through pipe 8 into the trough or hopper 9, shown more particularly in Figs. 3 and 4. A valve 10 is arranged in the bottom of hopper 9 provided with a number of spaced notches 11 for receiving the liquid from the slot 12 in the bottom of hopper 9. This will cause spaced streams of liquid to pass through the bottom slot 13 of hopper 9 on to one of the belts 14 or 15, as the case may be. These belts may be of any width and of any length desired, the same, of course, being proportioned to properly fit in the casing 3. These belts are mounted on drums 16 and 17 supported on suitable shafts carried by the supporting frame works 18 and 19. The drum 17 is an idler, while drum 16 is the driving drum and is rigidly secured to the shaft 20 which extends to the exterior of the machine as shown in Fig. 2 where a pulley 21 is mounted in position for receiving the driving belt 22 operated by any suitable power and at any desired speed.

During the operation of the machine the belts 14 and 15 move comparatively slowly continuously and continuously receive a supply of matter to be desiccated from the trough 9. As this matter is discharged in small streams it is necessary to spread the same evenly in order to produce an even drying action, before the material is removed from the belt. To accomplish this a loosely rotatably mounted roller 23 is provided, which rests on the belts 14 and 15 and which acts as spreading means for spreading the different rows of material placed on the belt by the trough 9. As the belt moves the spread material will go over a system of heating coils 26 and be heated thereby. At the same time that the heat begins to act on the matter on the belts said matter will also be subjected to suction provided through the action of what may be termed an exhaust pipe 27 connected to a suitable suction pump. This supply pipe is connected to one or any number of auxiliary pipes 28 leading into the casing 3. In this manner the condition of the air in the casing 3 will take up or dry out of the material on the belts the water contents. The drums 16 and 17 are spaced a sufficient distance apart to permit the action of the heat and the suction to dry the matter on the belt sufficiently to cause the same to adhere by the time said matter reaches the drum 17. By this action the matter being dried will not fall off the belt as it passes around the drum 17. Though the matter has been dried sufficiently to adhere to the belt or belts it is not thoroughly desiccated and consequently is again heated on its return trip by a second series of heating coils 29 arranged immediately beneath the lower run of the belt. This second heating and the continued action of the suction will thoroughly dry or dessicate the material on the belt, the action of the suction being such as to cause the drying action to take place before the material can be cooked and consequently the dried product is still in its natural state except the water has all been removed by the time it reaches the drum 16 on the return trip of the belt. As it is comparatively hard as it reaches the drum 16 a breaking roller 30 is provided, formed of any desired material, as for instance metal or wood, said roller being journaled in suitable supports and formed polygonal in shape. This breaking of the dried or desiccated matter will cause most of said matter to drop into the discharge hopper 31, though some will pass by the breaking roller. To thoroughly clean the belt, one or more scrapers 32, preferably of hard wood is or are provided, which resiliently bears against the belts as these scrapers are pivotally mounted and held against the belt by suitable springs 33. In this way the belt or belts, as the case may be, is or are cleaned of the dried or desiccated material while a new supply of material is provided by trough 9, in fact this operation of supplying and removing is continuous as long as the machine is in operation.

By making the machine wider a larger number of belts could be used side by side and a larger amount of material desiccated at the same time, whereby the output would be not only continuous but of great volume, with the desiccated product in the natural state except for the removal of the water therefrom.

As the material is removed from the belt by the breaker or roller 30 and the scraper 32 it falls into the hopper 31. This hopper is provided with a discharge pipe 34 extending into a chamber 35 in which a suitable receptacle 36 is positioned, as for instance a small truck or wagon. A gate valve 37 is arranged in pipe 34 and formed in such a manner as to be operated by a pull and push rod 38 extending to the exterior of the machine. The chamber 35 is provided with a door 39 which is a sufficient tight fit to maintain a vacuum or rarefaction in the chamber under ordinary circumstances, said rarefaction being created by a pipe 40 extending to the suction pipe 27. Normally the valve 37 is open so that the desiccated material will fall directly into container 36. When it is desired to remove the container 36 and empty the same or place another container in position, the rod 38 is pushed inwardly for closing valve 37 and then valve 41 is closed after which door 39 is opened. This, of course, will destroy the vacuum or rarefaction in chamber 35, but as the valves 41 and 37 are closed this makes no difference. The container 36 is then removed and another one substituted after which the door 39 is closed. Valve 41 is then opened for a short time until a certain rarefaction has been secured in chamber 35 after which valve 37 is opened and left open until it again becomes necessary to remove the container 36. If desired a window could be provided in door 39. A window 42 is preferably provided in the upper part of the end plate 7, said window being preferably in line with the hopper 9 and also in line with the window 43 in said hopper so as to easily observe the operation of the hopper and see that the level of liquid therein is properly maintained.

What I claim is:

1. In a desiccating apparatus of the character described, a container, means for feeding material to be desiccated into the interior of the container, a traveling metallic belt arranged in the container positioned so that it will have one upper and one lower horizontal run, means for directing the matter to be desiccated on to the upper run of said belt, heating means arranged almost in contact with and below each run of the belt for heating the matter on the respective runs for desiccating the same, means for removing the desiccated material from the belt, means for causing said belt to move, and means for maintaining a rarefaction in the container.

2. In a desiccating apparatus of the character described, a container, means for feeding material to be desiccated into the interior of the container, a traveling metallic belt arranged in the container and positioned so that it will have an upper and lower horizontal run, means for directing matter to be desiccated on to the upper run of said belt, means for spreading said matter, a heating member arranged immediately below and out of contact with each run of said belt so as to heat the material on the respective runs as the material passes over the respective heaters, means for maintaining a rarefaction in said container during the movement of said belt, means for removing the desiccated material from the belt after it has passed the second heater, and means for directing said desiccated material to a discharge point.

3. A desiccating apparatus comprising a closed container, a pair of spaced drums arranged in said container, a belt positioned on said drums and arranged to have parallel horizontal runs, a heating coil arranged below each of said runs, a pipe for directing material to be dried to one end of one of the runs, means for spreading said material, means for maintaining a rarefaction in the container, and means for removing the dried material from the belt immediately before the material reaches the point from which it has started whereby there may be a continuous supplying of natural undried, and a continuous removal of desiccated material.

GEORGE C. CONTANT.